(12) United States Patent
Aker

(10) Patent No.: US 7,049,999 B1
(45) Date of Patent: May 23, 2006

(54) MODULATION CIRCUIT FOR A VEHICULAR TRAFFIC SURVEILLANCE DOPPLER RADAR SYSTEM

(75) Inventor: John L. Aker, Estero, FL (US)

(73) Assignee: Applied Concepts, Inc., Plano, TX (US)

( * ) Notice: Subject to any disclaimer, the term of this patent is extended or adjusted under 35 U.S.C. 154(b) by 107 days.

(21) Appl. No.: 11/059,199

(22) Filed: Feb. 16, 2005

(51) Int. Cl.
*G01S 13/58* (2006.01)

(52) U.S. Cl. ............... 342/114; 342/104; 342/115; 342/147; 342/175; 342/192; 342/194; 342/195; 342/196; 342/200

(58) Field of Classification Search ............... 342/27, 342/28, 104–122, 128–145, 175, 194–198, 342/200, 201, 147
See application file for complete search history.

(56) References Cited

U.S. PATENT DOCUMENTS

| | | | |
|---|---|---|---|
| 3,680,085 A | 7/1972 | Del Signore | |
| 3,750,172 A | 7/1973 | Tresselt | |
| 3,760,414 A | 9/1973 | Nicolson | |
| 3,761,908 A * | 9/1973 | Gehman | 342/27 |
| 3,898,655 A | 8/1975 | Tresselt | |
| 4,003,049 A | 1/1977 | Sterzer et al. | |
| 4,052,722 A | 10/1977 | Millard | |
| 4,072,945 A | 2/1978 | Katsumata et al. | |
| 4,123,719 A | 10/1978 | Hopwood et al. | |
| 4,214,243 A | 7/1980 | Patterson | |
| 4,219,878 A | 8/1980 | Goodson et al. | |
| 4,282,524 A * | 8/1981 | Eymann et al. | 342/122 |
| 4,435,712 A | 3/1984 | Kipp | |
| 4,673,937 A | 6/1987 | Davis | |
| 4,740,045 A | 4/1988 | Goodson et al. | |
| 4,806,935 A * | 2/1989 | Fosket et al. | 342/120 |
| 4,968,968 A | 11/1990 | Taylor | |
| 5,049,885 A | 9/1991 | Orr | |
| 5,083,129 A | 1/1992 | Valentine et al. | |
| 5,134,406 A | 7/1992 | Orr | |
| 5,151,701 A | 9/1992 | Valentine et al. | |
| 5,177,691 A | 1/1993 | Welles et al. | |
| 5,206,651 A | 4/1993 | Valentine et al. | |
| 5,270,720 A | 12/1993 | Stove | |
| 5,300,932 A | 4/1994 | Valentine et al. | |
| 5,305,007 A | 4/1994 | Orr et al. | |
| 5,315,302 A | 5/1994 | Katsukura et al. | |

(Continued)

FOREIGN PATENT DOCUMENTS

FR    2747788 A    10/1997

OTHER PUBLICATIONS

Definition of "double modulation" on the Institute for Telecommunication Sciences website (www.its.bldrdoc.gov); Boulder, Colorado; 1996.*

(Continued)

*Primary Examiner*—Bernarr E. Gregory
(74) *Attorney, Agent, or Firm*—Scott T. Griggs; Griggs Bergen LLP

(57) ABSTRACT

A modulation circuit for a traffic surveillance Doppler radar system is disclosed. In one embodiment, the modulation circuit is utilized in a vehicular traffic surveillance Doppler radar system that processes a reflected double-modulated FM signal to determine a target range based upon a phase angle signal differential associated with the target. The modulation circuit may include a digital-to-analog (D/A) converter/voltage regulator/oscillator arrangement or a D/A converter/varactor device/oscillator arrangement. The modulation circuit generates a double-modulated FM signal based upon a frequency versus voltage characteristic associated with the oscillator.

25 Claims, 4 Drawing Sheets

U.S. PATENT DOCUMENTS

| | | |
|---|---|---|
| 5,347,120 A | 9/1994 | Decker et al. |
| 5,525,996 A | 6/1996 | Aker et al. |
| 5,528,245 A | 6/1996 | Aker et al. |
| 5,528,246 A | 6/1996 | Henderson et al. |
| 5,563,603 A | 10/1996 | Aker et al. |
| 5,570,093 A | 10/1996 | Aker et al. |
| 5,691,724 A | 11/1997 | Aker et al. |
| 5,818,383 A | 10/1998 | Stockburger et al. |
| 5,861,837 A * | 1/1999 | Richardson et al. ........ 342/198 |
| 5,886,663 A | 3/1999 | Broxon et al. |
| 6,008,752 A | 12/1999 | Husk et al. |
| 6,121,917 A | 9/2000 | Yamada |
| 6,121,919 A | 9/2000 | Ameen et al. |
| 6,198,427 B1 | 3/2001 | Aker et al. |
| 6,266,627 B1 | 7/2001 | Gatsonides |
| 6,384,768 B1 | 5/2002 | Kai |
| 6,417,796 B1 | 7/2002 | Bowlds |
| 6,501,418 B1 | 12/2002 | Aker |
| 6,580,386 B1 | 6/2003 | Aker et al. |
| 6,646,591 B1 | 11/2003 | Aker et al. |
| 6,744,379 B1 | 6/2004 | Aker et al. |
| 6,831,593 B1 | 12/2004 | Aker et al. |
| 6,831,595 B1 | 12/2004 | Isaji |

OTHER PUBLICATIONS

U.S. Appl. No. 11/059,474, filed Aug. 6, 2005, Aker, John L., Unpublished.

US. Appl. No. 11/059,476, filed Oct. 10, 2005, Aker, Unpublished.

Skolnik, Merrill I. "Introduction to Radar Systems," 1962, pp. 98-99, McGraw-Hill Book Company, Inc., New York.

* cited by examiner

MODULATION CIRCUIT FOR A VEHICULAR TRAFFIC SURVEILLANCE DOPPLER RADAR SYSTEM

This application discloses subject matter related to the subject matter disclosed in the following commonly owned, co-pending patent applications: (1) "Vehicular Traffic Surveillance Doppler Radar System," filed on Feb. 16, 2005, application Ser. No. 11/059,476, in the name of John L. Aker; and (2) "System and Method for Calibrating a Vehicular Traffic Surveillance Doppler Radar," filed on Feb. 16, 2005, application Ser. No. 11/059,474, in the name of John L. Aker; both of which are hereby incorporated by reference for all purposes.

TECHNICAL FIELD OF THE INVENTION

This invention relates, in general, to police Doppler radar systems and, in particular, to a modulation circuit for generating double-modulated FM signals in a police Doppler radar system that is utilized for vehicular traffic surveillance.

BACKGROUND OF THE INVENTION

The role of radar in traffic safety enforcement is widespread throughout the United States and the principal tool for police traffic surveillance is Doppler radar. In a police Doppler radar system, an emitted microwave frequency signal is reflected from a target vehicle, causing a change in the frequency of the signal in proportion to a component of the velocity of the target vehicle. The Doppler radar system measures the frequency differential and scales the measurement to miles per hour, for example, in order to display the velocity of the target vehicle to a policeman or other Doppler radar system operator. Using the existing frequency differential scheme, conventional police Doppler radar systems are capable of a high degree of accuracy with regard to vehicle speed measurements in environments having one target vehicle.

It has been found, however, that the existing police Doppler radar systems are not necessarily successful in environments having multiple vehicles in position to reflect the radar signal. In particular, identification of the vehicle whose speed is being displayed when multiple vehicles are in a position to reflect the radar signal has proven difficult due to "look-past error," which occurs in situations where the intended target vehicle in the foreground has a significantly smaller radar cross-section than an unintended target vehicle in the background. Accordingly, further improvements are warranted in the field of traffic surveillance Doppler radar systems.

SUMMARY OF THE INVENTION

A modulation circuit is disclosed for a traffic surveillance Doppler radar system that substantially eliminates look-past error by determining the range and speed of vehicles in multiple vehicle environments. The modulation circuit economically and efficiently provides a double-modulated FM signal which is utilized to determine the target range as well as the target speed.

In one embodiment, the modulation circuit is employed in a vehicular traffic surveillance Doppler radar system that processes a reflected double-modulated FM signal to determine a target range based upon a phase angle signal differential associated with the target. The modulation circuit may include a digital-to-analog (D/A) converter/voltage regulator/oscillator arrangement or a D/A converter/varactor device/oscillator arrangement. The modulation circuit generates the double-modulated FM signal based upon a frequency versus voltage characteristic associated with the oscillator.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
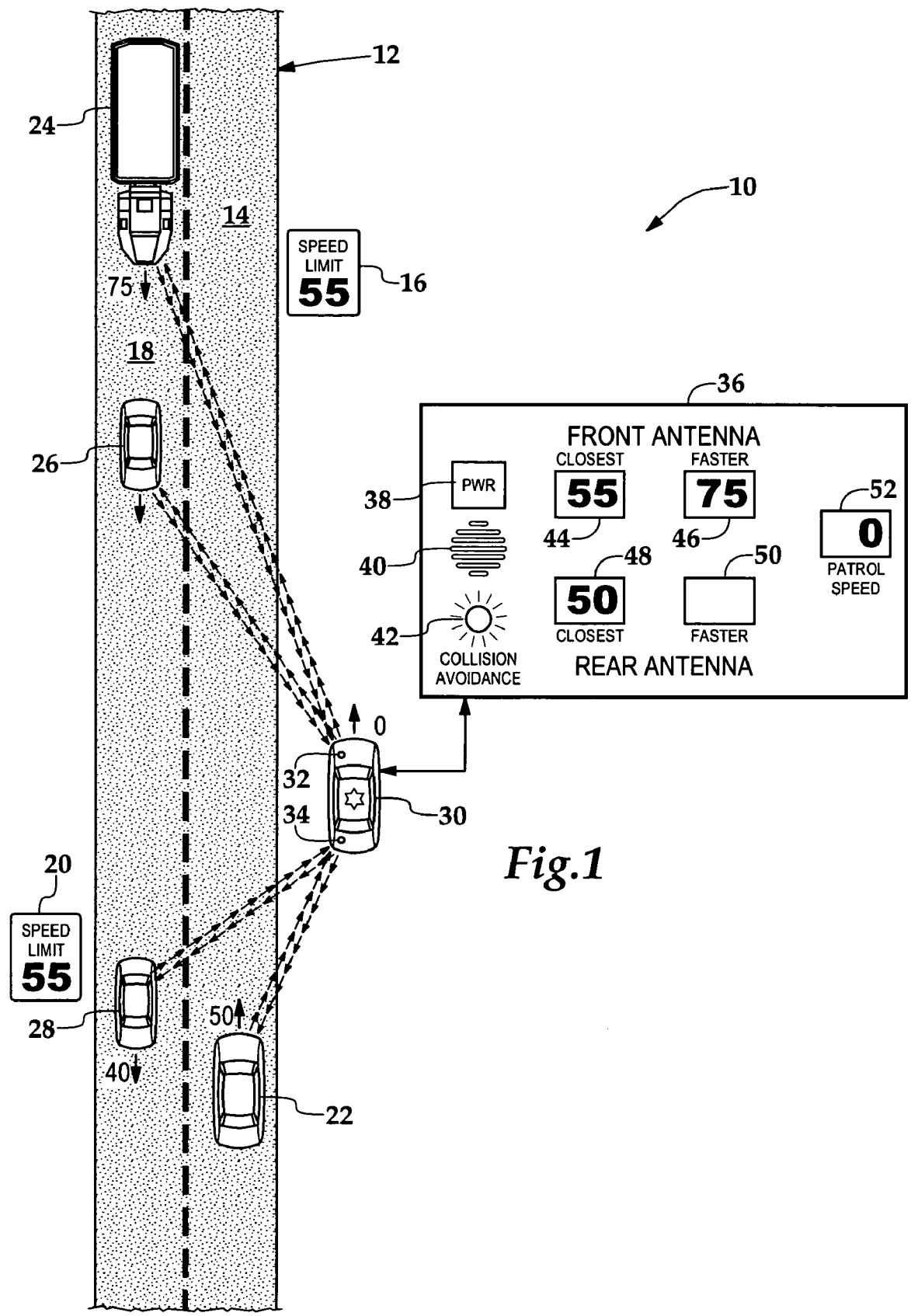
FIG. 1 depicts a schematic illustration of a multiple vehicle environment wherein one embodiment of the vehicular traffic surveillance Doppler radar system is being utilized.

Referring initially to FIG. 1, therein is depicted a multiple vehicle environment 10 wherein one embodiment of the vehicular traffic surveillance Doppler radar system is being utilized. A highway 12 includes a northbound lane 14 having a speed limit of 55 mph as depicted by speed limit sign 16 and a southbound lane 18 having a speed limit of 55 mph as depicted by speed limit sign 20. A vehicle 22 is traveling in the northbound lane 14 at a speed of 50 mph as indicated by the northbound arrow and number "50" proximate to the front portion of the vehicle 22. Vehicles 24, 26, and 28 are traveling in the southbound lane 18 at speeds of 75 mph, 55 mph, and 40 mph, respectively. A patrol vehicle 30 equipped with a vehicular traffic surveillance Doppler radar system is stationary and facing north in a location that is proximate to the northbound lane 14. The vehicle 22 is approaching the patrol vehicle 30 quickly. Additionally, with respect to the position of patrol vehicle 30, vehicles 24 and 26 are positioned such that conditions are present for look-past error.

A front-facing antenna 32 and a rear-facing antenna 34 are mounted on the patrol vehicle 30 for surveying traffic. A control panel 36 is associated with the patrol vehicle 30 and preferably secured to the dashboard in the interior of the patrol vehicle 30. The control panel 36 includes a power button 38, a speaker 40, and a collision avoidance indicator 42. Displays 44 and 46 indicate the speeds (in mph) of the closest vehicle and the faster vehicle, respectively, associated with the front-facing antenna 32. Similarly, displays 48 and 50 indicate the speeds (in mph) of the closest vehicle and the faster vehicle, respectively, associated with the rear-facing antenna 34. In instances where only one vehicle is associated with the rear-facing antenna 34, the display 50 is empty. A display 52 indicates the speed (in mph) of the patrol vehicle 30. It should be appreciated that the displays 44–52 may either be dedicated to displaying the indicators discussed hereinabove or configurable to provide other types of indications. For example, a display may be configured to provide a history of the speed of a particular targeted vehicle.

As illustrated, the patrol vehicle 30 is monitoring the traffic in both the northbound lane 14 and southbound lane 18. With regard to both antennas 32 and 34, the vehicular traffic surveillance Doppler radar system is in a stationary, closest and faster, approaching only mode. In this mode, the police vehicle 30 is stationary and monitoring the speeds of both the closest and faster vehicles approaching the police vehicle 30. It should be appreciated, however, that other modes of operation are within the teachings of the present invention. By way of example, the following table provides a non-exhaustive matrix of the more common operator selectable modes of the multi-mode radar system disclosed herein.

TABLE I

Common Operator Selectable Modes

| Patrol Vehicle | Type of Signal(s) | Receding/Approaching |
| --- | --- | --- |
| Stationary | Closest and Faster | Approaching |
| Stationary | Closest and Faster | Receding or Approaching |
| Stationary | Closest and Faster | Receding |
| Stationary | Closest | Approaching |
| Stationary | Closest | Receding or Approaching |
| Stationary | Closest | Receding |
| Moving | Closest and Faster | Approaching |
| Moving | Closest and Faster | Receding or Approaching |
| Moving | Closest and Faster | Receding |
| Moving | Closest | Approaching |
| Moving | Closest | Receding or Approaching |
| Moving | Closest | Receding |

With respect to the forward-facing antenna 32, the officer operating the vehicular traffic surveillance Doppler radar system is intending to target vehicle 26 which is a small sports car having a relatively small radar cross-section ($\sigma_1$). The forward-facing antenna 32 emits double-modulated FM signals that spread less than ten degrees from an axis of the forward-facing antenna 32. In one embodiment, the double-modulated FM signals are a continuous wave signal transmission that is alternated between a first and second frequency. It should be appreciated that although the present invention is described as utilizing double-modulated FM signals, other types of modulated FM signals may be utilized. For example, triple and higher order modulated FM signals may be utilized. The double-modulated FM signals reflect off of the vehicle 26 and the vehicle 24 which is a large truck having a relatively large radar cross-section ($\sigma_2$), wherein $\sigma_2 \gg \sigma_1$. Hence, the vehicle 24 has a stronger reflected signal than the vehicle 26 even though the vehicle 24 is farther away from the patrol vehicle 30 than the vehicle 26. The reflected double-modulated FM signals generated by the vehicles 24 and 26 are received by the forward-facing antenna 32 and processed to resolve the multiple targets by determining the direction, speed, and range of the targeted vehicles 24 and 26.

As will be discussed in further detail hereinbelow, the vehicular traffic surveillance Doppler radar system receives the reflected double-modulated FM signals and performs a quadrature demodulation on the reflected double-modulated FM signals. In one embodiment, homodyne reception is utilized wherein a voltage having the original carrier frequency is generated and combined with the incoming reflected double-modulated FM signals. The quadrature demodulated, reflected FM signals are then converted to digital signals and a fast Fourier transform (FFT) is performed that results in an approaching or closing target spectrum and a receding or opening target spectrum. In one implementation, a complex FFT is performed on the data. Analysis of the resulting spectra using the multi-direction sensing capabilities of the instant police radar indicates that both of the vehicles 24 and 26 are approaching. The frequency signal differentials associated with each target are also analyzed to determine that the vehicle 24 is traveling at 75 mph and the vehicle 26 is traveling at 55 mph. The phase angle signal differentials associated with each of the targets are analyzed to determine that the vehicle 26 is closer to the patrol vehicle 30 than the vehicle 24. The speed of the closest vehicle, i.e., vehicle 26, is indicated at the display 44 and the speed of the faster vehicle, i.e., vehicle 24, is indicated at display 46.

The police officer operating the vehicular traffic surveillance Doppler radar system uses the displayed information to determine that the closest target, which is vehicle 26, is traveling at 55 mph and a more distant target, which is vehicle 24, is traveling at 75 mph. Existing radar systems assume that the strongest target is the closest target; namely, the vehicle 26 in the illustrated example. Accordingly, if patrol vehicle 30 had been equipped with an existing radar system, then the vehicle 26 could have appeared to have been traveling 75 mph in a 55 mph zone. The vehicular traffic surveillance Doppler radar system presented herein avoids this false positive due to look-past error by calculating target ranges based upon the phase angle signal differentials associated with the targets rather than assuming signal strength is indicative of range and, in particular, the strongest signal is from the closest vehicle.

With respect to the rear-facing antenna 34, the officer operating the vehicular traffic surveillance Doppler radar system is intending to target vehicle 22. The emitted double-modulated FM signals reflect from the vehicle 22 and the vehicle 28 which is heading south in the southbound lane 18. The reflected double-modulated FM signals are processed to determine the direction, speed, and range of the targets. The vehicle 28 is receding from the patrol vehicle 30, so the speed and range of the vehicle 28 are ignored since the vehicular traffic surveillance Doppler radar system is an approaching only mode. The speed, 50 mph, and range, 300 ft, of the vehicle 22 are determined and the display 48 indicates that the closest vehicle is traveling at 50 mph. The police officer uses the displayed information to determine that vehicle 22 is traveling at 50 mph.

Further, the vehicular traffic surveillance Doppler radar system includes safety features that determine if conditions are safe for the patrol vehicle 30 to pull-out in front of oncoming traffic based on the speed and range of the oncoming vehicles. Based on the speed (50 mph) and the range (300 ft) of the vehicle 22, the vehicular traffic surveillance Doppler radar system determines that conditions are hazardous and a collision with vehicle 22 is possible if the patrol vehicle 30 pulls into the northbound lane 14. In one implementation, to indicate that conditions are hazardous and a collision is possible, the vehicular traffic surveillance Doppler radar system provides a visual indication via collision avoidance indicator 42 and an audio indication via speaker 40 to the police officer operating the vehicular traffic surveillance Doppler radar system.

Figure 2:
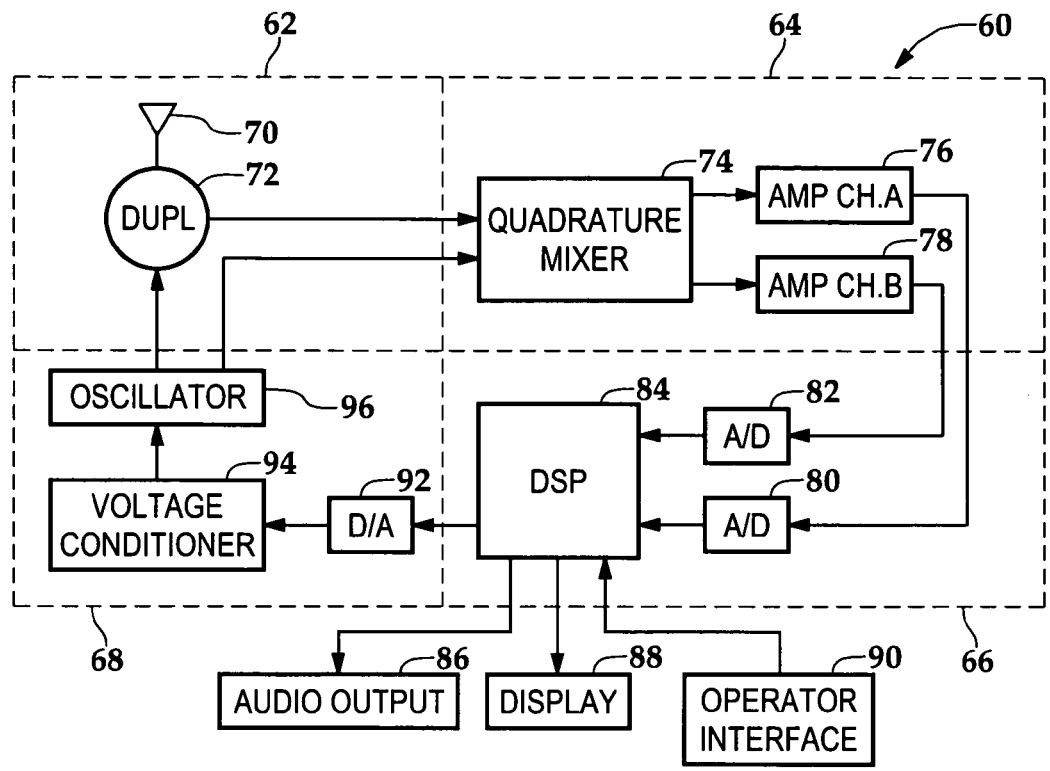
FIG. 2 depicts a schematic diagram of one embodiment of the vehicular traffic surveillance Doppler radar system.

FIG. 2 depicts one embodiment of the vehicular traffic surveillance Doppler radar system which is generally designated 60. The vehicular traffic surveillance Doppler radar system includes an antenna circuit portion 62, a quadrature circuit portion 64, a processing circuit portion 66, and a modulation circuit portion 68. The antenna circuit portion 62 includes an antenna 70 that transmits outgoing radar waves in the form of double-modulated FM signals and receives reflected double-modulated FM signals from stationary and moving objects including intended and unintended target vehicles. A duplexer 72 guides the outgoing double-modulated FM signals from the modulation circuit portion 68 to antenna 70 and guides reflected radar waves received by antenna 70 to the quadrature circuit portion 64.

The quadrature circuit portion 64 includes a quadrature mixer 74 coupled to the duplexer 72 in order to receive the reflected double-modulated FM signals. The quadrature circuit portion 64 is also coupled to the modulation circuit portion 68 in order to receive a local oscillator signal. As will be explained in further detail in FIG. 3, the quadrature mixer 74 performs a quadrature demodulation by mixing the local oscillator signal with incoming RF of reflected radar waves in two separate mixers in two separate channels such that one channel is shifted by 90° relative to the other channel. The quadrature demodulation results in a channel A signal that is driven to amplifier 76 and a channel B signal that is driven to amplifier 78. Preferably, amplifiers 76 and 78 are matched, low noise amplifiers. The amplified channel A and B signals are driven to the processing circuit portion 66 and received by analog-to-digital (A/D) converters 80 and 82, respectively. The A/D converters 80 and 82 sample the analog signals from amplifiers 76 and 78, respectively, and output the sampled signals as digital data sampled signals on one or more transmission paths, such as busses, infrared (IR) communication paths, or cables, connected to a digital signal processor (DSP) 84.

The DSP 84 processes the digital data samples from channels A and B by performing a FFT thereon to develop the aforementioned approaching target Fourier spectrum and receding target Fourier spectrum. The target Fourier spectra are searched for targets and the direction each target is traveling relative to the patrol vehicle is identified. Data associated with the spectra is further analyzed to determine the speeds of the identified targets based upon frequency signal differentials associated with the targets. Additional information regarding the direction and speed sensing capabilities of the radar system of the present invention may be found in the following co-owed United States patents: (1) U.S. Pat. No. 6,198,427, entitled "Doppler Complex FFT Police Radar With Direction Sensing Capability," issued on Mar. 6, 2001 in the names of Aker et al.; and (2) U.S. Pat. No. 6,646,591, entitled "Doppler Complex FFT Police Radar With Direction Sensing Capability," issued on Nov. 22, 2003 in the names of Aker et al.; both of which are hereby incorporated by reference for all purposes.

The range of the identified targets is calculated based upon a phase angle signal differential associated with the targets. With regard to a particular target, the phase angle is arbitrary. However, the difference between the phase angle for the particular target with respect to a first set of data and the phase angle for the particular target with respect to a second set of data is indicative of the range between the police radar of the present invention and the particular target. Further information regarding the target range capabilities of the radar system of the present invention may be found in the following commonly owned, co-pending patent application: "Vehicular Traffic Surveillance Doppler Radar System," filed on Feb. 16, 2005, application Ser. No. 11/059,476, in the name of John L. Aker; which is hereby incorporated by reference for all purposes. Information regarding the target range self-calibrating capabilities of the radar system of the present invention may be found in the following commonly owned, co-pending patent application: "System and Method for Calibrating a Vehicular Traffic Surveillance Doppler Radar," filed on Feb. 16, 2005, application Ser. No. 11/059,474, in the name of John L. Aker; which is hereby incorporated by reference for all purposes. Target metrics, such as direction, speed, and range, determined by the DSP 84 are provided to the operator via an audio output 86 and a display 88, which, in one implementation, may be control unit 36 of FIG. 1. An operator interface 90, which may include front panel or remote controls, provides for general operation of the system including operator selectability of the aforementioned multiple modes of operation.

A D/A convertor 92 receives multiple digital signals from the DSP 84 and converts these signals to a voltage which is supplied to a voltage conditioner 94. As will be discussed in further detail hereinbelow, the voltage conditioner 94 may be a voltage regulator or varactor device, for example. Operating in combination with the converter 92, the voltage conditioner 94 provides two voltages to an oscillator 96 that, in turn, generates the double-modulated FM signals. In particular, a frequency versus voltage characteristic that is associated with the oscillator 96 is utilized to generate two frequencies with only a relatively small difference in the applied voltages.

In one implementation, the oscillator 96 comprises a dielectric resonator oscillator (DRO) or a Gunn diode oscillator that utilizes a negative resistance property of bulk gallium arsenide (GaAs) to convert an applied DC voltage into microwave power. It should be appreciated by those skilled in the art that although a particular arrangement of circuitry has been illustrated with respect to the radar system of the present invention, the radar system of the present invention may comprise any combination of hardware, software, and firmware. In particular, each of the circuit portions 62, 64, 66, and 68 of the present invention may comprise any combination of hardware, software, and firmware.

Figure 3:
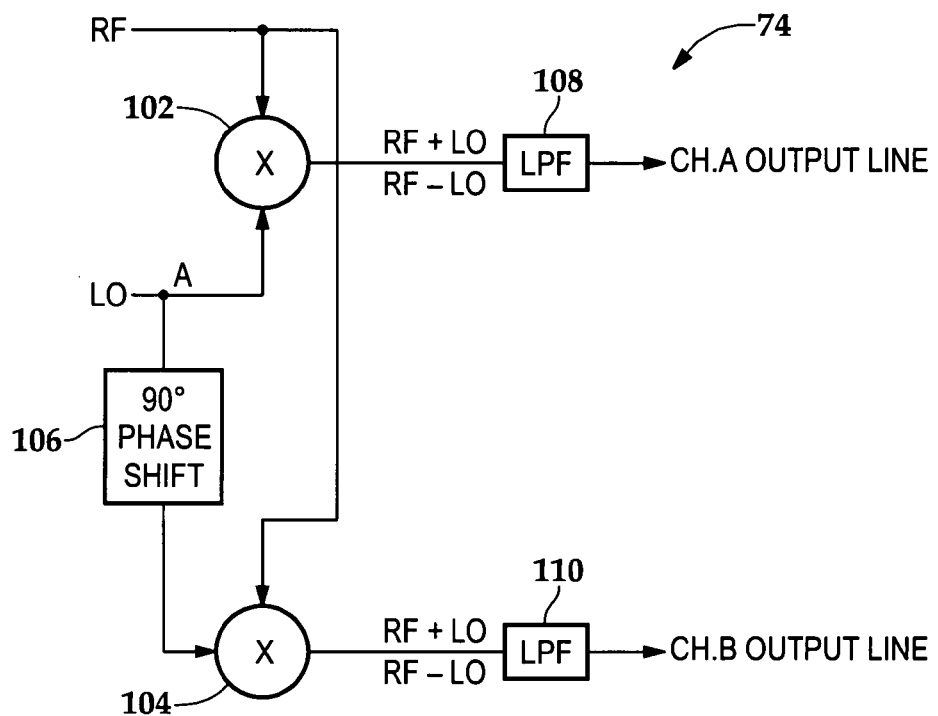
FIG. 3 depicts a schematic diagram of one embodiment of a quadrature mixer for the vehicular traffic surveillance Doppler radar system.

FIG. 3 depicts one embodiment of the quadrature mixer 74. As previously discussed, the function of the quadrature mixer 74 is to mix local oscillator energy with incoming RF of reflected radar waves in two separate mixers in two separate channels and shift one channel 90° relative to the other channel. Incoming RF from the duplexer 72 is provided to a channel A mixer 102 and a channel B mixer 104. Local oscillator (LO) energy arrives from oscillator 96 and is provided as a second input to mixer 102. The local oscillator energy is also coupled to a second input of mixer 104 via a phase shifter 106 which, in the illustrated embodiment, is a 90° phase shifter. The phase shifter 106 shifts the local oscillator signal by 90°, or any integer multiple of 90°, in either direction relative to the local oscillator signal. In alternative embodiments, instead of shifting the local oscillator signal by 90°, the incoming RF can be shifted by 90° at the input of one mixer relative to the same incoming RF at the input of the other mixer.

The 90° phase shift can be achieved in any known manner associated with quadrature demodulation. In the preferred embodiment, the 90° phase shift is achieved by having a microwave transmission line which is one-quarter wavelength (at the frequency of operation) longer in the path from the local oscillator or RF input to one mixer than it is in the path to the other mixer. By way of example, other techniques such as reactive circuits or delay lines may also be used.

The mixers 102 and 104 modulate the local oscillator signals with the Doppler shifted RF signals reflected from stationary and moving objects and output sum and difference frequencies on a channel A output line and a channel B output line. Low pass filters 108 and 110 are coupled to the channel A and B output lines, respectively, in order to remove the upper sideband (local oscillator plus Doppler shifted RF) signals from each of the spectrum on the channel A and B output lines so that only the difference frequencies are outputed. Preferably, to reduce errors and noise, the mixers 102 and 104 and low pass filters 108 and 110 are matched as closely as possible since amplitude variations between channels A and B may cause noise in the system.

Figure 4:
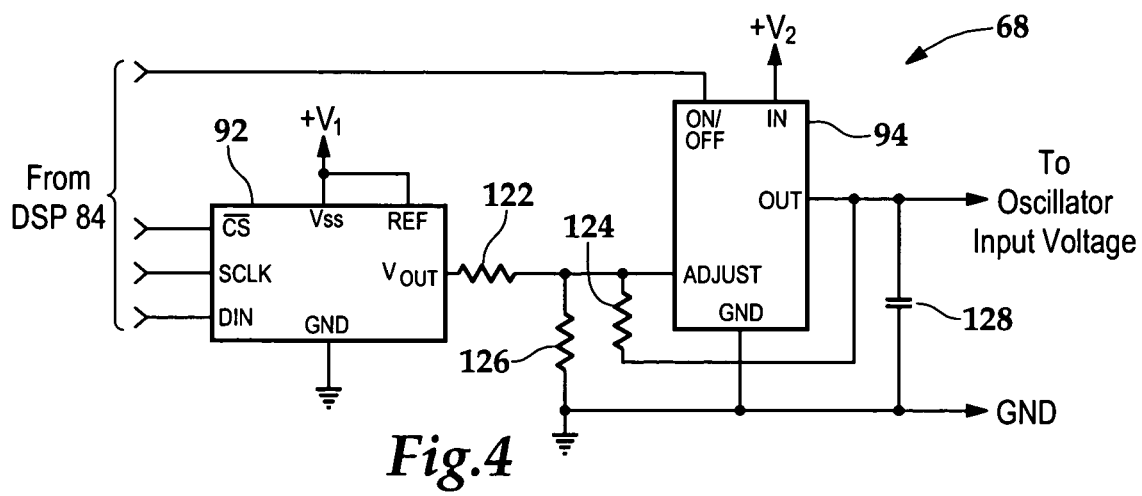
FIG. 4 depicts a schematic diagram of one embodiment of a D/A converter and voltage conditioner arrangement for use in a modulation circuit portion.

FIG. 4 depicts one embodiment of the D/A converter 92 and the voltage conditioner 94, which is depicted as a voltage regulator, for use in the modulation circuit portion 68. The D/A converter 92 includes a power supply input ($V_{SS}$) pin, a reference voltage (REF) pin, a D/A converter voltage output ($V_{OUT}$) pin, a ground (GND) pin, a serial data input (DIN) pin, a serial clock input (SCLK) pin, and a chip-select input (CS) pin. As illustrated, the D/A converter 92 is a multi-wire interface that converts digital signals from the DSP 84 to an output voltage at the $V_{OUT}$ pin. In one implementation, the converter 92 is a multi-bit (e.g., 8-bit or 12-bit), serial interface convertor that utilizes an internal reference voltage-to-current converter to generate a reference current and provide an input-output differential of approximately 5 V. A series of current-mirrors steer the desired fraction of the total current to a voltage across a resistor that is buffered by an output buffer amplifier before being driven to the $V_{OUT}$ pin. Suitable converters include the MAX5383/MAX5384/MAX5385 series of D/A converters from Maxim Integrated Products (Sunnyvale, Calif.). Preferably, a MCP4921/4922 D/A converter from Microchip Technology Inc. (Chandler, Ariz.) is utilized.

The $V_{OUT}$ pin drives an output voltage to a resistor 122 that is connected to the voltage regulator 94, which includes a power (ON/OFF) pin, an input (IN) pin, an output (OUT) pin, a ground (GND) pin, and an adjustment voltage (ADJUST) pin. The ON/OFF pin receives a signal from the DSP 84, the ADJUST pin receives the voltage output provided by the D/A converter 92, and the IN pin receives the input voltage of $+V_2$ in order to provide an output voltage at OUT pin. Preferably, the voltage, $+V_1$, associated with the $V_{SS}$ pin is 5 V and the voltage, $+V_2$, associated with the IN pin is 8 V. Suitable voltage regulators include the LM2941/LM2941C series of low dropout adjustable regulators form National Semiconductor Corporation (Santa Clara, Calif.).

The output voltage from the D/A converter 92 is provided to the oscillator 96 as input voltage via resistor 124. Additionally, the output of the voltage regulator 94 is provided to the oscillator 96 as input voltage. The output of the resistor 122 (via resistor 126), the voltage regulator 94, and the input to the oscillator 96 (via capacitor 128) share a common ground.

Figure 5:
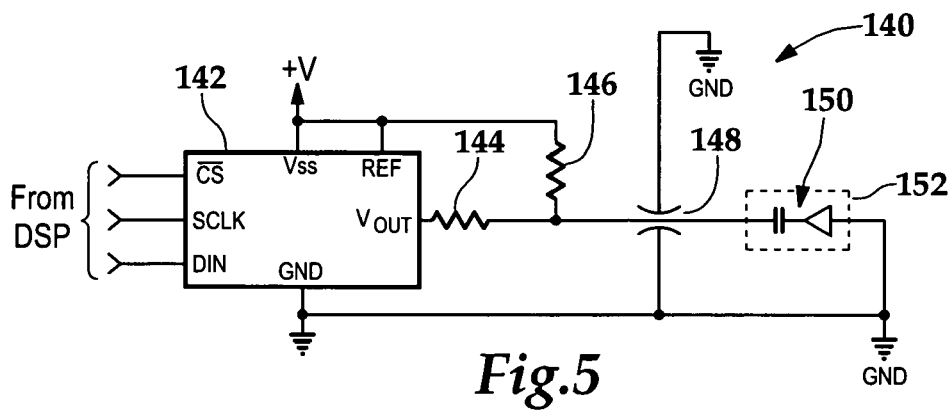
FIG. 5 depicts a schematic diagram of another embodiment of a D/A converter and voltage conditioner arrangement for use in the modulation circuit portion.

FIG. 5 depicts another embodiment, which is generally designated 140, of a D/A converter and voltage conditioner arrangement for use in the modulation circuit portion. A D/A converter 142, which is similar to the D/A converter 92 of FIG. 4, receives three input signals from the DSP and provides an output voltage at a $V_{OUT}$ pin. The output voltage is supplied to resistor 144 and the supply voltage is supplied to resistor 146, both of which are connected at a common junction to a feed-through capacitor 148. A varactor device 150 is connected in series to the feed-through capacitor 148. In one implementation, the varactor device 150 comprises a two-terminal diode that operates in the microwave range. A common ground is shared by the D/A converter 142, the feed through capacitor 148, and the varactor device 150. In one embodiment, a Gunn diode oscillator is utilized and the varactor device 150 is positioned in a cavity 152 of the oscillator. The frequency of the Gunn diode oscillator may be alternated between two frequencies by applying a square wave voltage signal to the varactor device 150 which, in turn, tunes the double-modulated FM signal generated by the oscillator.

Figure 6:
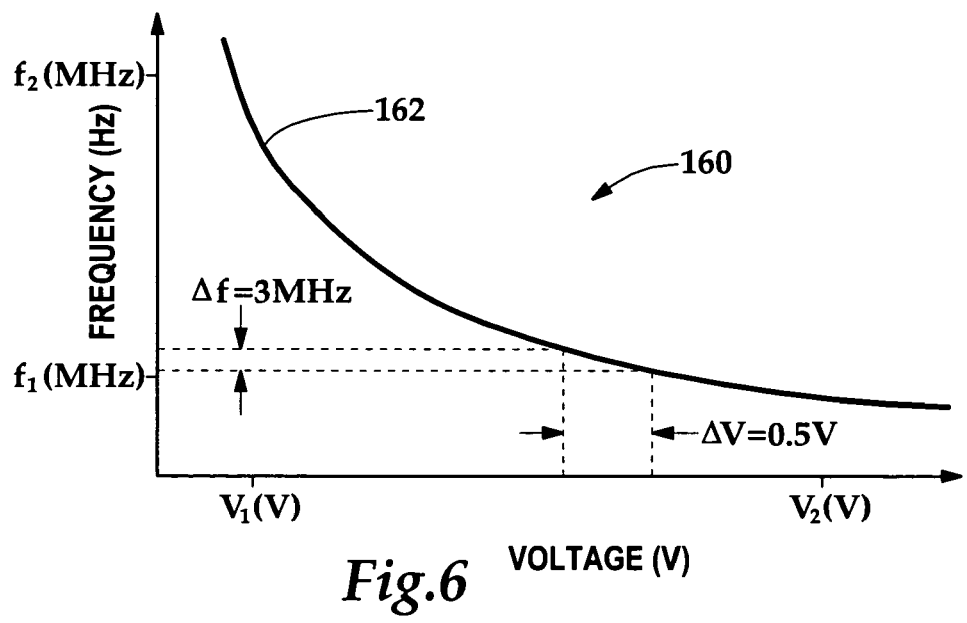
FIG. 6 depicts a graph of frequency versus voltage illustrating one embodiment of a frequency versus voltage characteristic associated with the modulation circuit portion.

FIG. 6 depicts a graph 160 of frequency (Hz) versus voltage (V) illustrating one embodiment of a frequency versus voltage characteristic 162 that specifies a non-linear, temperature dependent relationship between the input voltages applied to the oscillator and the double-modulated FM signals generated by the vehicular traffic surveillance Doppler radar system. In particular, the frequency versus voltage characteristic 162 illustrates how small changes in voltage, e.g., $\Delta V=0.5$ V, can produce significant changes in frequencies, e.g., $\Delta f=3$ MHz, since $f_2 >> f_1$. Accordingly, the double modulation circuit utilizes the frequency versus voltage characteristic 162 to provide double-modulated FM signals with only small changes in the voltage. Therefore, the modulation circuit economically and efficiently provides a double-modulated FM signal which is utilized to determine target metrics including direction, speed, and range.

Figure 7:
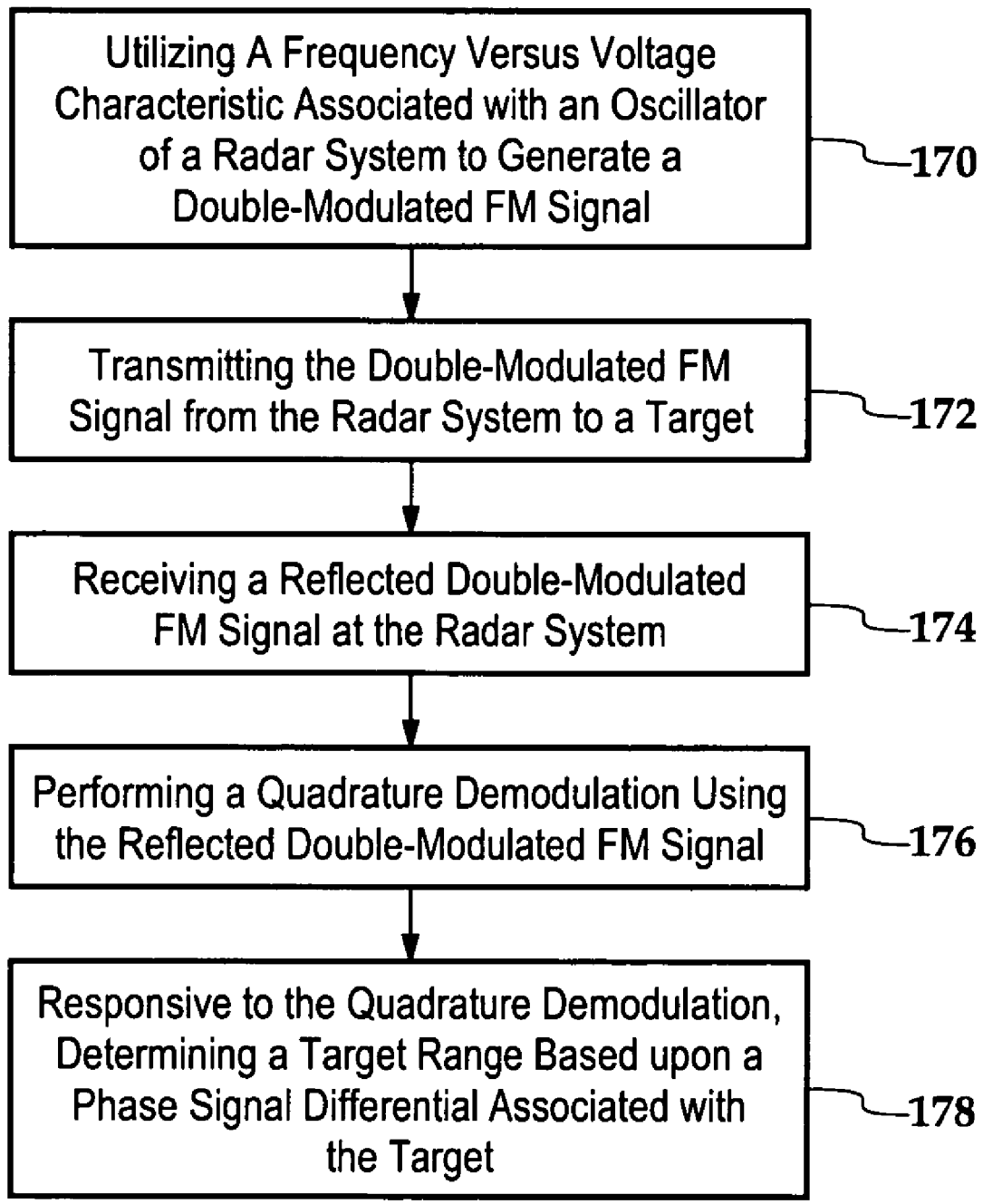
FIG. 7 depicts a flow chart of one embodiment of a method for vehicular traffic target resolution.

FIG. 7 depicts one embodiment of a method for vehicular traffic target resolution. At block 170, a frequency versus voltage characteristic that is associated with an oscillator of a radar system is utilized to generate a double-modulated FM signal. At block 172, the double-modulated FM signal is transmitted from the radar system to a target. At block 174, a reflected double-modulated FM signal is received at the radar system. At block 176, a quadrature demodulation is performed using the reflected double-modulated FM signal. At block 178, responsive to the quadrature demodulation, a target range is determined based upon a phase angle signal differential associated with the target. By determining target range in this manner, accurate target identification is achieved and the risk of mistaken identity is substantially eliminated.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A vehicular traffic surveillance Doppler radar system comprising:
   a modulation circuit portion for generating a double-modulated FM signal by utilizing an oscillator frequency versus voltage characteristic;

an antenna circuit portion coupled to the modulation circuit, the antenna circuit portion operable to transmit the double-modulated FM signal to a target and receive a reflected double-modulated FM signal;

a quadrature circuit portion coupled to the antenna circuit portion and the modulation circuit portion, the quadrature circuit portion for performing a quadrature demodulation using the reflected double-modulated FM signal; and a processing circuit portion, responsive to the quadrature demodulation, for calculating a target range based upon a phase angle signal differential associated with the target.

2. The vehicular traffic surveillance Doppler radar system as recited in claim 1, wherein the modulation circuit portion comprises:

a digital-to-analog convertor for converting a plurality of digital inputs to a convertor voltage output;

a voltage regulator, responsive to the convertor voltage output, operating in combination with the digital-to-analog convertor to generate first and second oscillator input voltages; and an oscillator, responsive to the first and second oscillator input voltages, for generating the double-modulated FM signal.

3. The vehicular traffic surveillance Doppler radar system as recited in claim 1, wherein the modulation circuit portion comprises:

a digital-to-analog convertor for converting a plurality of digital inputs to a convertor voltage output; and a varactor device positioned within a cavity of an oscillator, the varactor device, responsive to the convertor voltage output, for tuning the double-modulated FM signal.

4. The vehicular traffic surveillance Doppler radar system as recited in claim 1, wherein the antenna circuit portion comprises a duplexer coupled to an antenna, the duplexer guiding the double-modulated FM signal from the modulation circuit portion to the antenna and guiding the reflected double-modulated FM signal from the antenna to the quadrature circuit portion.

5. The vehicular traffic surveillance Doppler radar system as recited in claim 1, wherein the processing circuit portion comprises a digital signal processor for performing fast Fourier transform analysis on data associated with the quadrature demodulated, reflected double-modulated FM signals.

6. The vehicular traffic surveillance Doppler radar system as recited in claim 1, wherein the processing circuit portion determines a target speed based upon a frequency signal differential associated with the target.

7. The vehicular traffic surveillance Doppler radar system as recited in claim 1, wherein the processing circuit portion performs a fast Fourier transform that results in an approaching target spectrum and a receding target spectrum to determine a target direction.

8. A modulation circuit for a vehicular traffic surveillance Doppler radar system, the modulation circuit comprising:

a digital-to-analog convertor for converting a plurality of digital inputs to a convertor voltage output;

a voltage regulator, responsive to the convertor voltage output, operating in combination with the digital-to-analog convertor to generate first and second oscillator input voltages; and an oscillator, responsive to the first and second oscillator input voltages, for generating a double-modulated FM signal based upon a frequency versus voltage characteristic associated with the oscillator.

9. The modulation circuit as recited in claim 8, wherein the digital-to-analog convertor comprises a multi-bit, multi-wire serial interface digital-to-analog convertor.

10. The modulation circuit as recited in claim 8, wherein the voltage regulator comprises a positive voltage regulator having an input-output differential of approximately 5 V.

11. The modulation circuit as recited in claim 8, wherein the oscillator comprises a Gunn diode oscillator.

12. The modulation circuit as recited in claim 8, wherein the frequency versus voltage characteristic defines a non-linear, temperature dependent relationship between the first and second oscillator input voltages and the double-modulated FM signal.

13. A modulation circuit for a vehicular traffic surveillance Doppler radar system, the modulation circuit comprising:

a digital-to-analog convertor for converting a plurality of digital inputs to a convertor voltage output; and a varactor device positioned within a cavity of an oscillator, the varactor device, responsive to the convertor voltage output, for tuning a double-modulated FM signal generated by the oscillator.

14. The modulation circuit as recited in claim 13, wherein the digital-to-analog convertor comprises an multi-bit, multi-wire serial interface digital-to-analog convertor.

15. The modulation circuit as recited in claim 13, wherein the varactor device comprises a two-terminal diode operating in the microwave-range.

16. The modulation circuit as recited in claim 13, wherein the oscillator is selected from the group consisting of dielectric resonator oscillators and Gunn diode oscillators.

17. The modulation circuit as recited in claim 13, wherein the frequency versus voltage characteristic comprises a non-linear, temperature dependent relationship between the first and second oscillator input voltages and the double-modulated FM signal.

18. A method for vehicular traffic target resolution comprising:

utilizing a frequency versus voltage characteristic associated with an oscillator of a radar system to generate a double-modulated FM signal;

transmitting the double-modulated FM signal from the radar system to a target;

receiving a reflected double-modulated FM signal at the radar system;

performing a quadrature demodulation using the reflected double-modulated FM signal; and responsive to the quadrature demodulation, determining a target range based upon a phase angle signal differential associated with the target.

19. The method as recited in claim 18, wherein the frequency versus voltage characteristic comprises a non-linear, temperature dependent relationship between voltages supplied to the oscillator and the double-modulated FM signal.

20. The method as recited in claim 18, wherein performing the quadrature demodulation further comprises mixing the reflected double-modulated FM signal with a local oscillator signal generated by the oscillator.

21. The method as recited in claim 20, wherein mixing the reflected double-modulated FM signal further comprises shifting, prior to the mixing, the double-modulated FM signal by an integer multiple of 90 degrees relative to the local oscillator signal.

22. The method as recited in claim 20, wherein mixing the reflected double-modulated FM signal further comprises shifting, prior to the mixing, the local oscillator signal by an integer multiple of 90 degrees.

23. The method as recited in claim 18, wherein determining a target range further comprises performing a fast Fourier transform on data associated with the reflected double-modulated FM signals.

24. The method as recited in claim 18, further comprising determining a target speed based upon a frequency signal differential associated with the target.

25. The method as recited in claim 18, further comprising performing a fast Fourier transform that results in an approaching target spectrum and a receding target spectrum to determine a target direction.

* * * * *